S. BORTON, DEC'D.
C. P. BORTON, ADMINISTRATRIX.
SEWING MACHINE.
APPLICATION FILED JUNE 18, 1907. RENEWED AUG. 1, 1912.
1,041,585.
Patented Oct. 15, 1912.
7 SHEETS—SHEET 6.
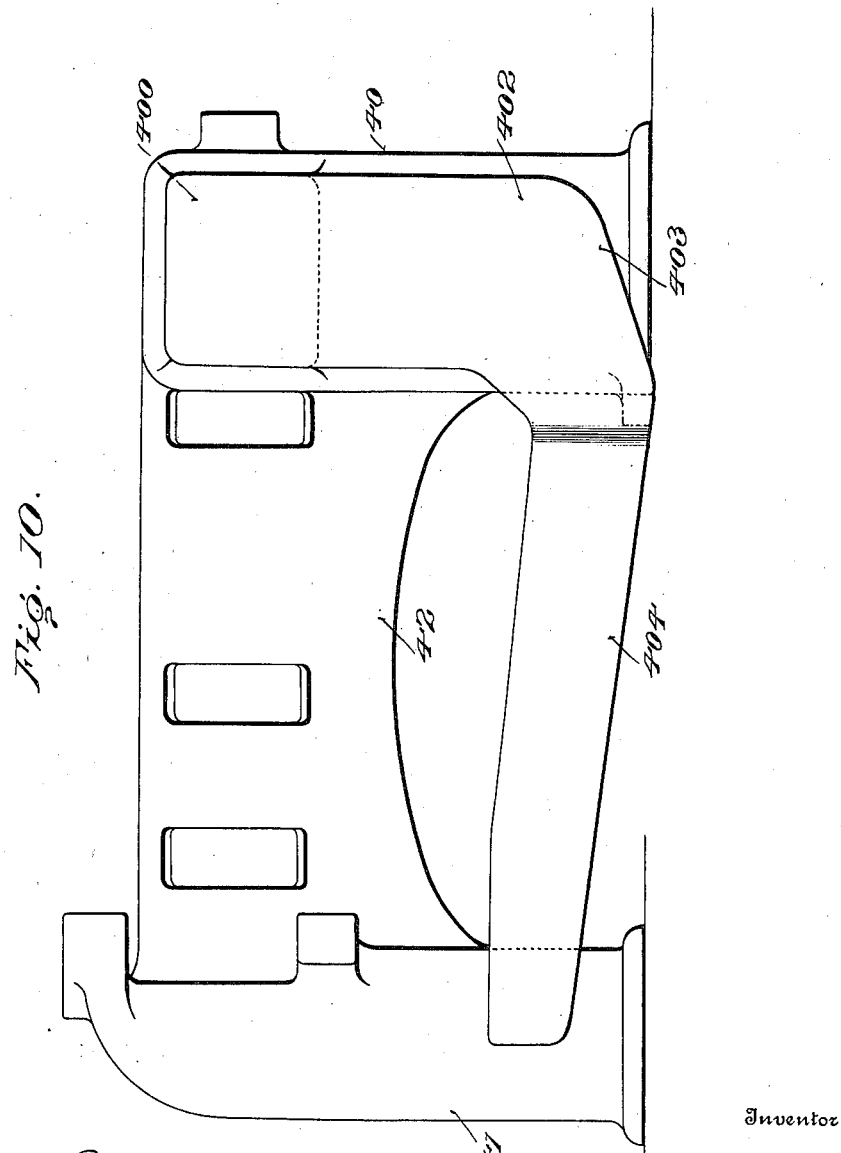

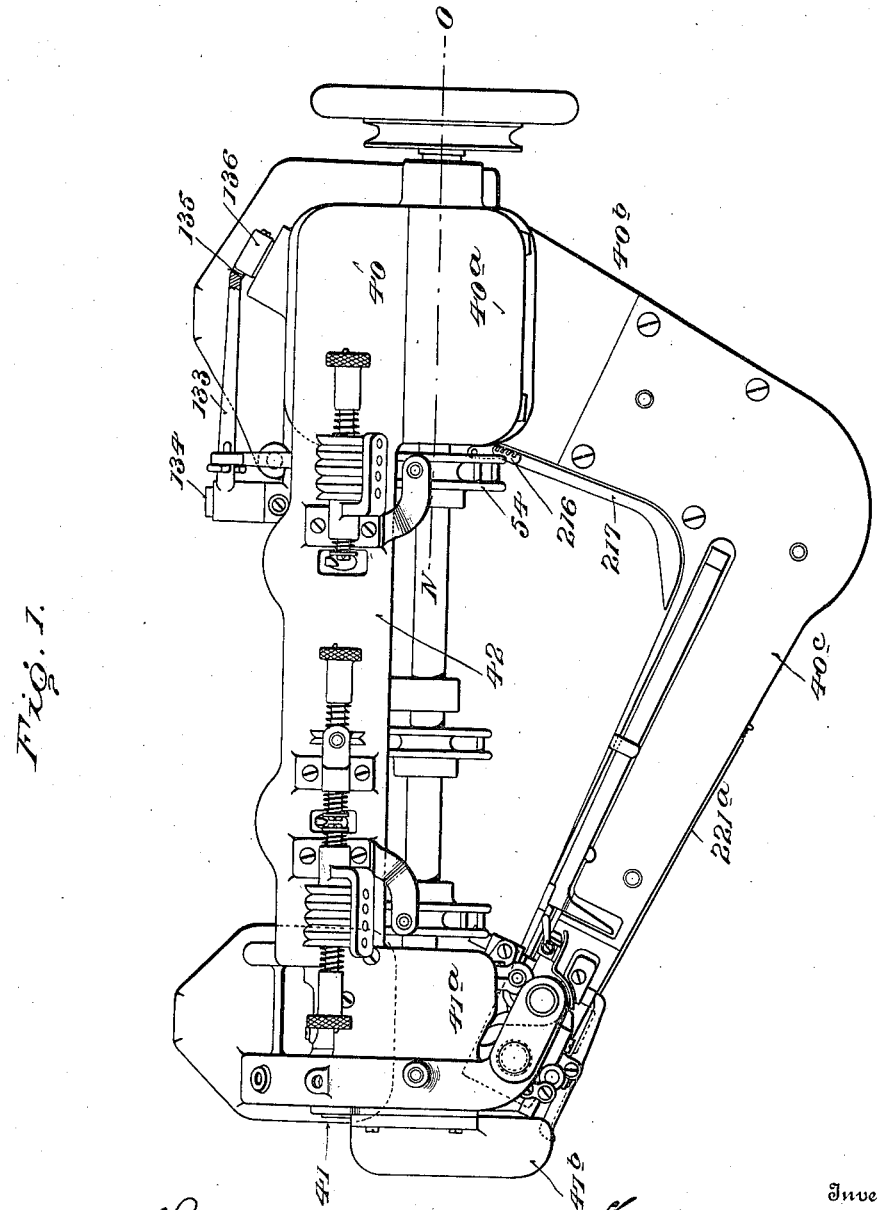

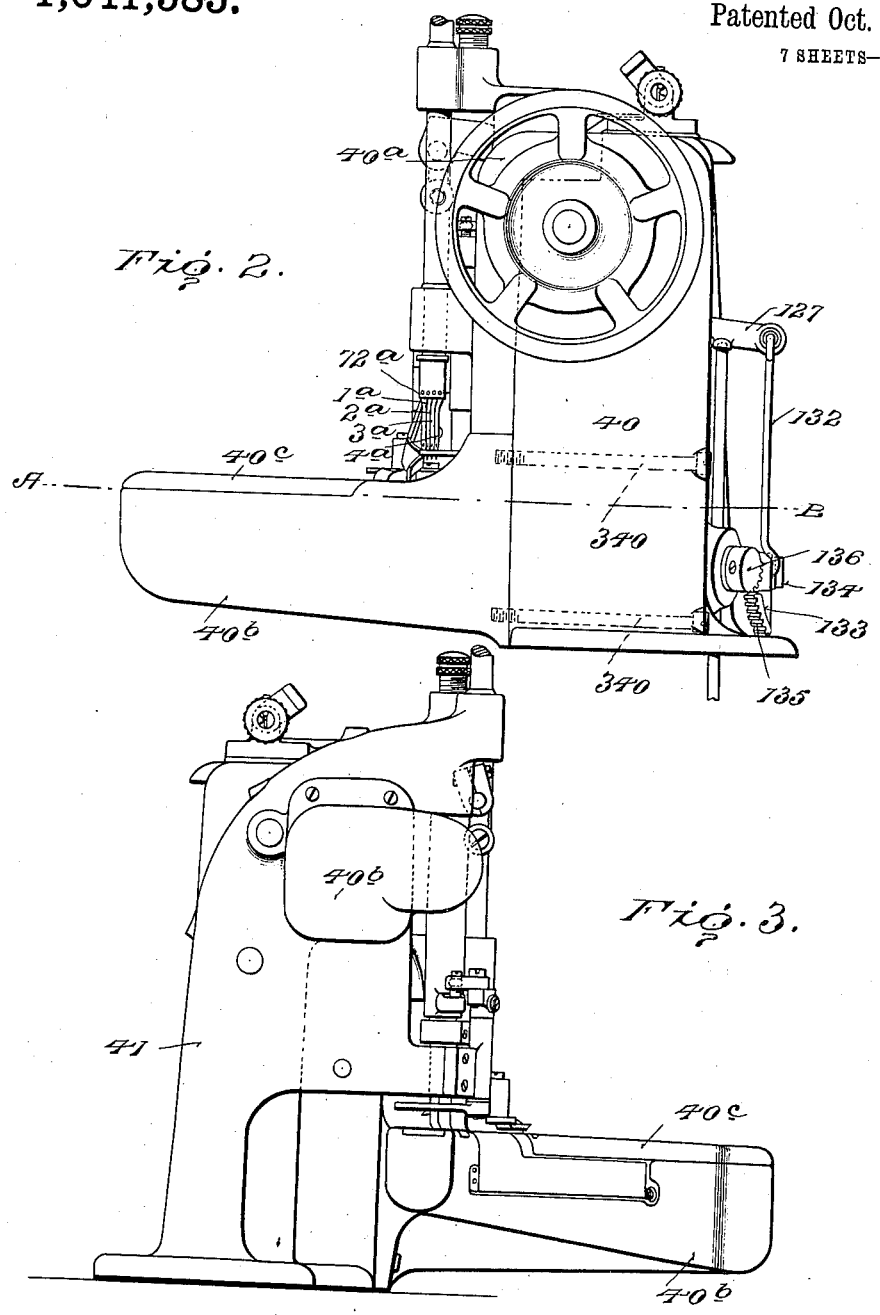

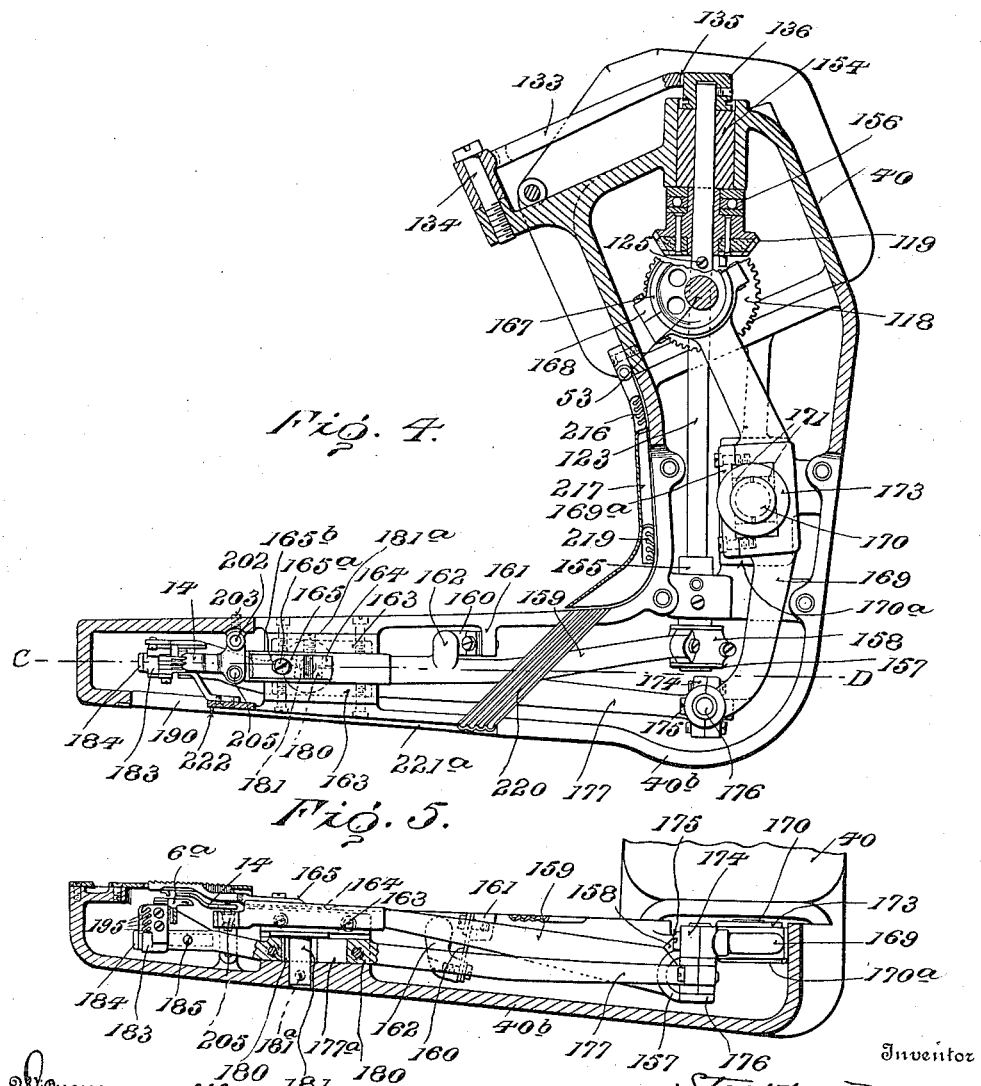

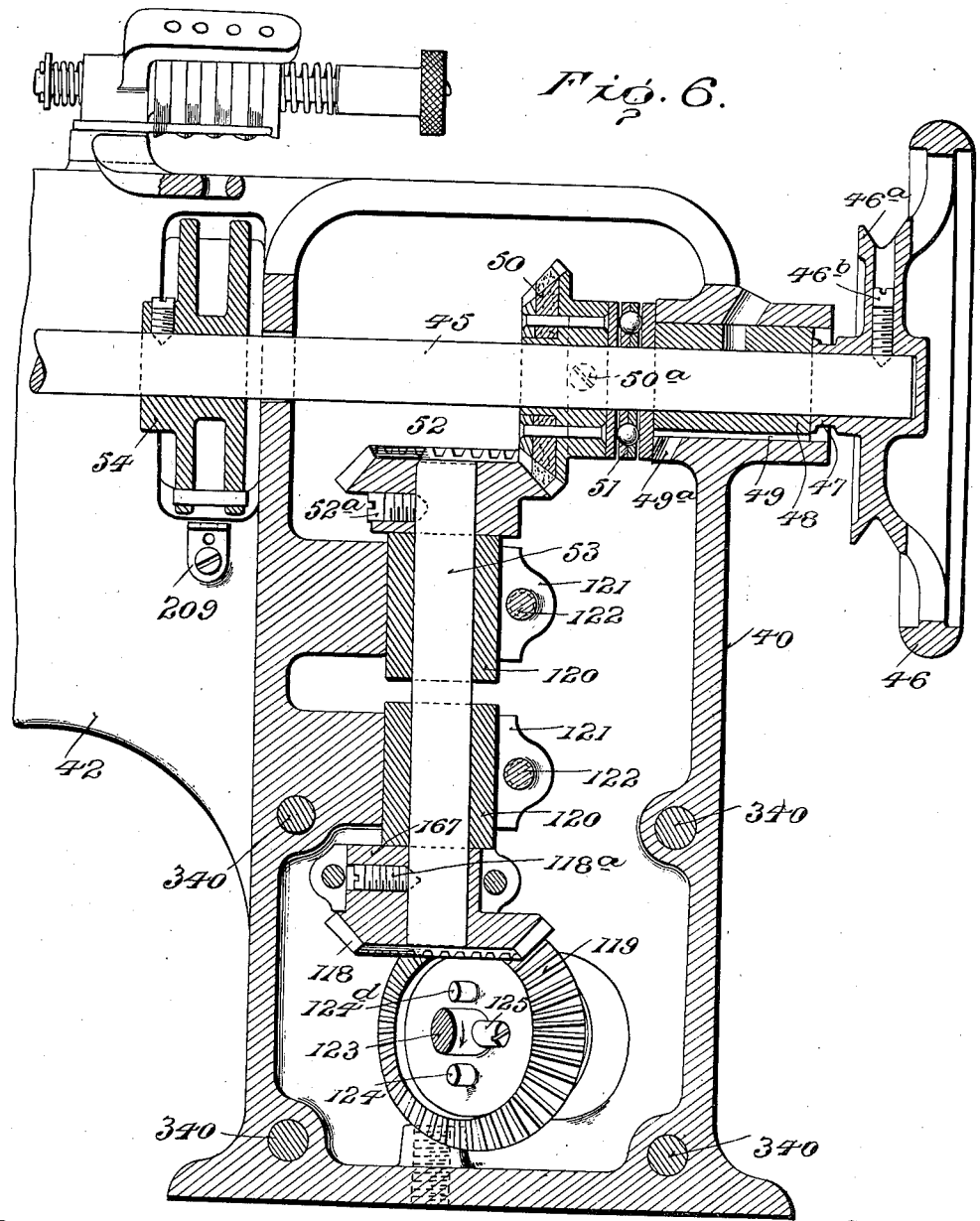

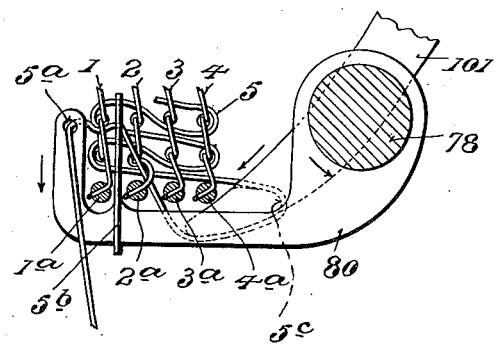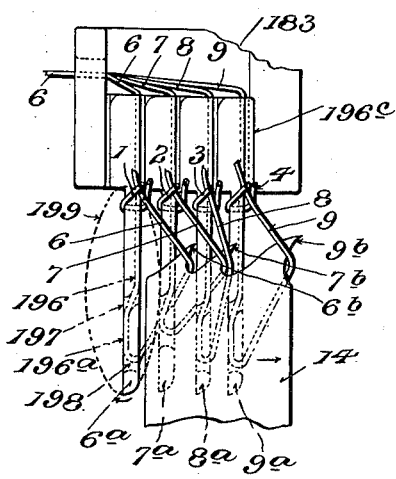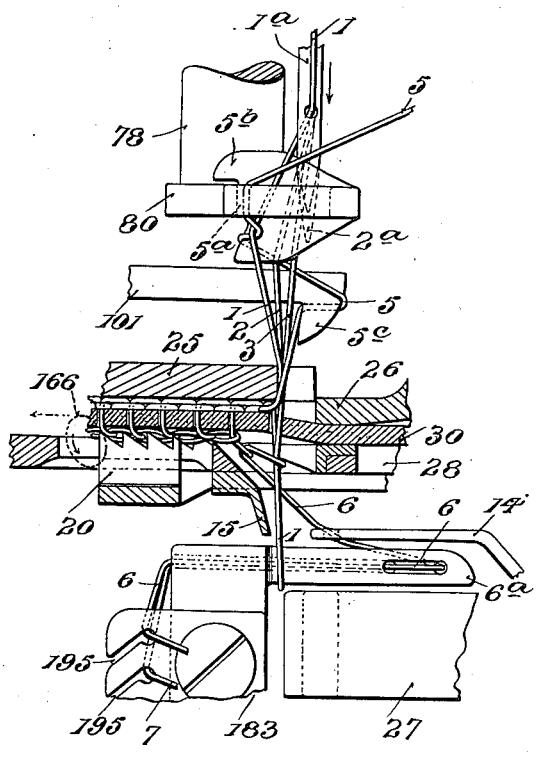

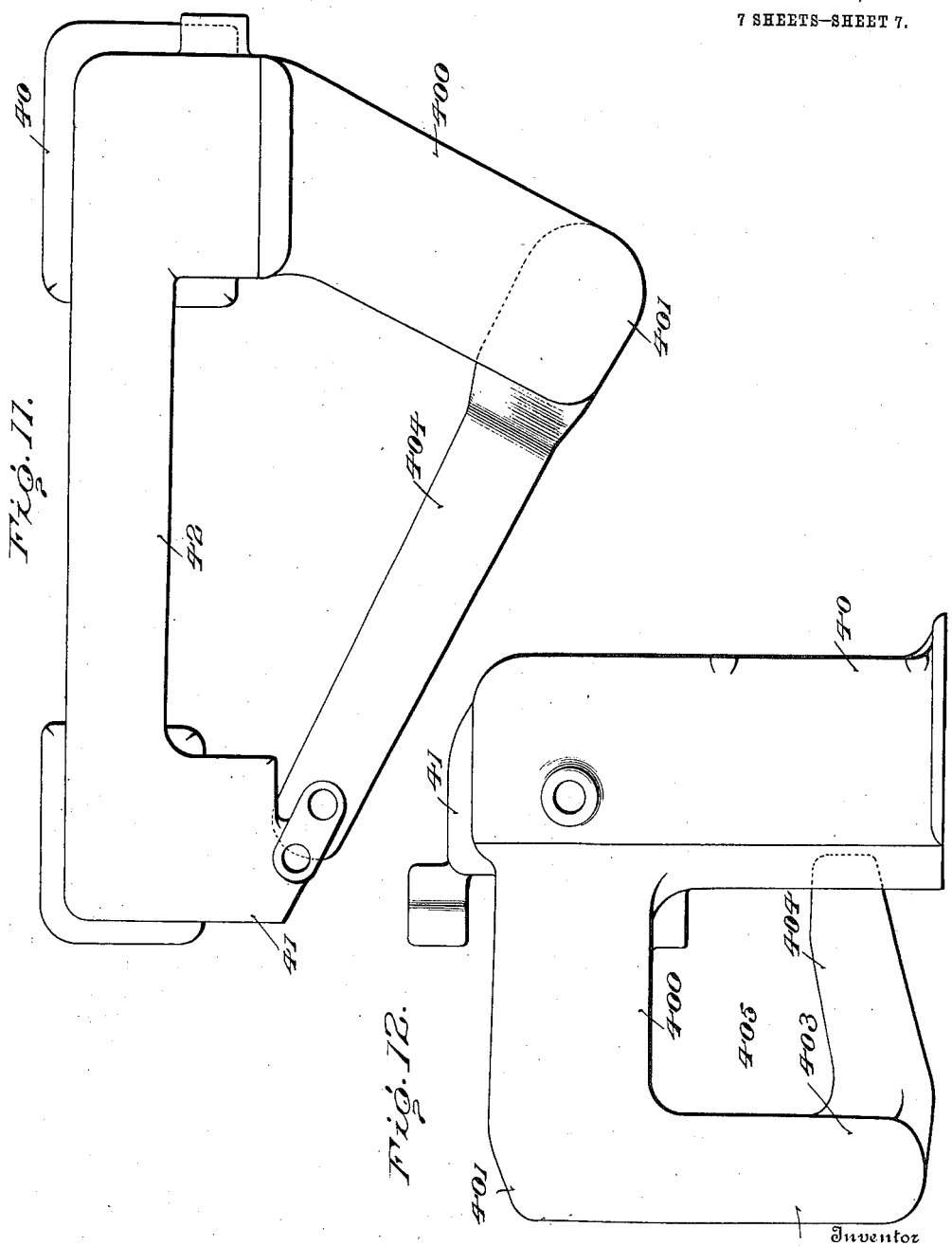

UNITED STATES PATENT OFFICE.

CHRISTINA P. BORTON, OF WARWICK, RHODE ISLAND, ADMINISTRATRIX OF STOCKTON BORTON, DECEASED, ASSIGNOR TO WILLCOX & GIBBS SEWING MACHINE COMPANY, OF NEW YORK, N. Y., A CORPORATION OF NEW YORK.

SEWING-MACHINE.

1,041,585.   Specification of Letters Patent.   Patented Oct. 15, 1912.

Original application filed December 13, 1906, Serial No. 347,649. Divided and this application filed June 18, 1907, Serial No. 379,654. Renewed August 1, 1912. Serial No. 712,767.

*To all whom it may concern:*

Be it known that STOCKTON BORTON, deceased, late a citizen of the United States and resident of the town of Warwick, county of Kent, State of Rhode Island, did invent new and useful Improvements in Sewing-Machines, fully set forth in the following specification.

The present invention relates to a sewing machine especially designed to produce, by one operation and at high speed (meaning that each needle shall be capable of making approximately three thousand or more stitches per minute), a complete seam of special form for joining two abutting edges of cut-knit goods.

This is a division of my application for United States Letters-Patent filed Dec. 13th, 1906, Sr. No. 347,649.

The present invention is particularly directed to an improved form of work-arm on the frame or casing of the machine; to driving connections extending along said arm to elements operating at the free end thereof; and to other features of improvement and combinations of elements hereinafter fully explained and set forth in the claims.

Figure 1 is a plan view of the complete machine; Fig. 2 is an elevation from the right of Fig. 1; Fig. 3 is an elevation from the left of Fig. 1; Fig. 4 is a horizontal section on line A—B, Fig. 2; Fig. 5 is a vertical section on line C—D of Fig. 4, some parts on the line of section being shown in elevation; Fig. 6 is a vertical section on line N—O, Fig. 1; Figs. 7, 8 and 9 illustrate the stitch-forming elements in their relative positions when the needles are at the limit of their upward movement, and the loopers below the throat-plate at the limit of their advance or forward movement in relation to the needles, Fig. 9 being a vertical sectional view through the throat-plate and the work, with the stitch-forming elements above and below the work-plate in elevation, Fig. 7 being a corresponding plan view (turned at right-angles to Fig. 9) of the elements above the throat-plate, and Fig. 8 being a corresponding plan view (turned at right-angles to Fig. 9) of the elements below the throat-plate; Figs. 10, 11 and 12 are views in outline of a modified form of machine frame in which the shape of the work-arm differs somewhat from that shown in the other figures,—Fig. 10 being a front elevation, Fig. 11, a top plan view on a smaller scale, and Fig. 12 an end view from the right of Fig. 11.

The machine herein illustrated and described is adapted to form, by a single operation, the seam constituting the subject-matter of my United States Letters-Patent, No. 883,614, dated March 31st, 1908; said seam is also illustrated and described in my above-mentioned patent application, Sr. No. 347,649, filed Dec. 13, 1906.

*Stitch-forming elements.*—A brief explanation of the movements of the parts which carry and act directly upon the nine threads—four needle-threads 1, 2, 3 and 4, cross-thread 5 and four hook or looper threads 6, 7, 8 and 9—will assist to an understanding of the driving connections and other mechanism by which said parts are actuated. Referring for this purpose to Figs. 7, 8 and 9, 1$^a$, 2$^a$, 3$^a$ and 4$^a$ are a gang of four parallel needles for the needle-threads 1, 2, 3 and 4 respectively; these needles are secured to a common needle-bar and reciprocate together, the needle 1$^a$ being slightly shorter than the others, as shown, and for reasons which need not be herein detailed. In addition to the four needles, the thread-carrier 80 and the hook 101 for the upper cross-thread operate above the throat-plate. The thread-carrier 80 is fixed to the lower end of an oscillatory shaft 78, and has a thread-eye 5$^a$ and a projecting thread-guiding blade 5$^b$. Hook 101, also fixed to the lower end of an oscillatory shaft (referred to later), is formed at its end with a depending horn 5$^c$. It will thus be seen that thread-carrier 80 and hook 101 oscillate with their respective shafts; at the stage of the stitch-forming operation shown in Figs. 7–9, the direction of their movement is indicated by arrows. A part of the presser-foot is shown at 26, and a part of an auxiliary foot, yieldingly carried by the presser-foot and designated a "chaining-foot", is shown at 25. 28 is the cloth or throat-plate and 30 is a piece of fabric on which the mechanism is operating. Of the elements operating below the throat-plate, 20 is a portion of the feed-surface operating upward through the throat-plate to advance the work, the path of its movement being illustrated by the ellipse 166 in dotted lines, Fig. 9. 6ª, 7ª, 8ª and 9ª are loopers secured together and moving in unison in an approximately horizontal plane. The dotted line ellipse 199, Fig. 8, illustrates the path described by the looper 6ª in its movement. 14 is an oscillatory loop-spreader having thread engaging hook-points or teeth 6ᵇ, 7ᵇ, 9ᵇ. 15 is a loop-shedder acting to prevent movement of the loops in the needle-threads as the loopers are withdrawn from said loops. 27 is a loop-check and needle-guide the functions of which need not be here explained in detail.

The stitch-forming elements referred to above, when actuated through driving connections, coöperate to form a seam such as heretofore referred to. The driving connections for the elements operating below the throat-plate will be hereinafter explained; the driving connections to the elements operating above the throat-plate require no further explanation herein.

*Work-arm and frame of machine.*—The frame-work of the machine comprises a main standard 40 of the hollow-column or box type, a standard 41 of the ribbed column type, a bridge 42 rigidly connecting the standards, and a work-arm 40ᵇ. The moving parts requiring lubricant are as far as practicable inclosed or covered by hollow portions of the frame-work so formed that the lubricant or oil is prevented from flowing or leaking to the outer surfaces, but is drained into reservoirs from which it may be readily removed at convenient intervals.

Removable caps are provided where access to working parts is necessary for adjustment or repairs. Thus, cap 40ª (Figs. 1 and 2) forms a part of the front and top of standard 40; cap 41ª covers parts working in the top of standard 41; and cap 41ᵇ covers an eccentric and its connections at the left-hand end of machine.

The hollow horizontal work-arm 40ᵇ extends forward from an opening (Fig. 4) in the lower part of the front face of the standard 40, to an elbow from which the arm continues toward the left and rearward, to its free end terminating beneath an overhanging portion of the head of the machine, as shown in Fig. 3. Four screws 340 (see Figs. 2 and 6) pass through horizontal openings in the wall of standard 40, and their threaded ends take into threaded sockets in the supporting end of the work-arm, thereby rigidly securing the latter to the standard. The horizontal portion of the arm between the supporting extremity and the elbow (designated for convenience the "bridging portion") extends, as clearly appears in Fig. 1, in a direction transverse to the direction of the horizontal portion from the elbow to the free end (designated for convenience the "work-supporting end" of the arm). The "bridging portion" is so called because it extends across or bridges the right hand or arm of the operator as the latter reaches under the work-arm in holding, guiding or manipulating the work along the "work-supporting end" of the arm. As illustrated in Fig. 1, these two parts of the arm extend in directions approximately at right angles to each other, but the angle of this transverse relationship may be greater or less than ninety degrees, as desired; each part also forms an angle of less than ninety degrees with reference to the main portion of the frame-work, as shown in Fig. 1. This bowing or bending of the horizontal work-arm forward from the frame-work or casing, leaves it suspended free of support from below and with unobstructed space or clearance, both above and below, for the work and the operator's hands and arms. The work-arm is trough-like in cross-section, giving access to the parts operating therein upon removal of a cover 40ᶜ (Fig. 1).

In many machines heretofore designed and commercially used for analogous work, it has been common to use a work-arm extending beneath and parallel to the bridge of the frame-work, the feed operating to advance the work onto the free end of and along said arm toward the end at which it is supported from one of the end standards of the machine. Therefore, in sewing up tubular work, such as stockings and the arms and legs of garments, for which such machines are especially designed, the work must accumulate on and about this arm until completed. Thereupon, in order to free and deliver the completed work from the machine, it is necessary to arrest its operation, elevate the presser-foot, needles, etc., cut or break the threads, and then pass the work, as gradually extended and flattened, back along the work-arm through the small space between the presser-foot above and the throat-plate, feed surface, etc., below—or in other words, the work must traverse in a reverse direction and with the machine stopped, the same path which it was caused to traverse by the feed of the machine during the formation of the seam. It is obvious that this operation of removing the work necessarily involves the double loss of consuming much of the operator's time and of putting the machine out of use for a material portion of each day's work. Furthermore, removal of the work in this way frequently so disturbs the positions of the several threads that the correct formation of stitches does not proceed immediately upon again starting the machine, and imperfect stitches are formed at the beginning of the new seam.

In the machine of the present invention, the losses and difficulties above referred to are obviated, as the feed operates to advance the completed work off the arm (*i. e.*, longitudinally thereof and toward its free end). Furthermore, the peculiar shape and disposition of the work-arm affords the desirable conditions of having the feed advance the work away from the operator, and of affording ample space above and below the work-arm, unobstructed by other parts of the machine, so that the operator may easily manipulate and arrange the work on or about the work-arm, and may unobstructedly view the operation of the mechanism, without having to assume an uncomfortable position or reach around or behind other parts of the mechanism. In operating the machine herein shown, the operator may preferably sit with her right side toward the machine in which position she will be able to look in the direction of the feed directly along its path and may comfortably extend her right-hand and arm across the underside of the bridging portion of the work-arm and readily handle the work and arrange it on the work-supporting portion of the arm to rapidly present it to the feed mechanism. It is also of importance to note that the present machine makes by a single operation a complete seam, including the threads which cross the meeting edges of the two pieces of work joined.

Figs. 10, 11 and 12 show a somewhat modified form of the hollow work-arm embodying the characteristics and principles of constructions above set forth. In this case the horizontal bridging part 400 of the work-arm extends forward, from the supporting end of the arm which joins the upper part of the front face of the standard 40 at an angle of less than ninety degrees to the main portion of the frame-work, to an elbow at 401, and from the latter the part 402 depends in an approximately vertical direction to a second elbow 403. From the elbow 403, the approximately horizontal work-supporting end or part 404 of the work-arm extends toward the left and rearward (Fig. 10) and terminates beneath an overhanging portion of the head of the machine in substantially the same manner as the corresponding portion of the work-arm of Figs. 1 to 3. The open space 405 (Fig. 12) thus provided for the right arm of the operative affords still further freedom of movement in manipulation, arranging and advancing the work along the part 404 of the arm. As shown in Fig. 11, the horizontal bridging portion 400 extends in a direction transverse to the direction of the work-supporting part 404, being similar in this respect to the work-arm of Fig. 1. It is apparent that with the outwardly bowed or elbowed work-arm of Figs. 10-12, substantially the same internal mechanism, with the exception of obvious changes necessary to adapt it to the differences of shape, may be employed as in the case of the form of the work-arm shown in Figs. 1 to 5.

*Main driving connections to elements below the throat-plate.*—45 is the main-shaft; at its right-hand end it carries the hand-wheel 46, having the usual grooved driving pulley $46^a$ integral therewith, and fixed on the shaft by a set-screw $46^b$ (Fig. 6). The hub of this combined wheel and pulley takes the end thrust of the shaft 45 against the end of bearing 48 in standard 40, and an oil flange 47 at the end of the hub sheds superfluous oil into the end of the bearing opening from which a groove 49 in the bearing conducts the oil through an opening $49^a$, to the inside of standard 40 which constitutes one of the reservoirs in which superfluous lubricant may accumulate.

50 is a bevel gear secured to shaft 45 by set-screw $50^a$ (Fig. 6) and meshing with a bevel gear 52 secured to vertical shaft 53 by set-screw $52^a$. Ball-thrust bearing 51 surrounds shaft 45 between gear 50 and bearing 48.

118 is a combined bevel-gear and looper-eccentric secured by set-screw $118^a$ to the lower end of shaft 53. The eccentric portion is numbered 167. Gears 52 and 118 are thus so placed that the end thrust on each will be balanced by the other, thus avoiding friction and the necessity of ball-thrust bearings or like anti-friction devices. The bearings for shaft 53 are plain bushings 120, 120 encircled and clamped by lugs or bracket arms 121, 121 split at their outer ends and adapted to be tightened against the bearings by screws 122, 122. Through connections explained hereafter, shaft 53 drives all of the moving parts operating below the throat-plate.

*The feed.*—123, Figs. 4 and 6, is the feed-shaft bearing in adjustably fixed bushings 154, 155. Bushing 154 receives the end thrust of bevel-gear 119 through the intermediate ball-thrust-bearing 156. Bevel-gear 119 is rotated by bevel-gear 118 with which it meshes, and a pin $124^d$ on gear 119 engages a screw-stud 125 (Fig. 6) on feed-shaft 123 to rotate the latter. Another pin 124 projecting from gear 119 in the path of stud 125, limits the rotation of shaft 123 independent of gear 119 and consequently independent of the rotation of the main shaft 45. The object of this lost motion connection will be explained hereafter. Shaft 123 extends through bearing 155 and carries the eccentric 157 (Figs. 4 and 5), and the latter is embraced by a capped bearing or eccentric-strap 158 at the end of feed-lever or feed-bar 159. Lever 159 is hung at about its middle on a flat-spring fulcrum 160, one end of said spring being fastened to a lug 161 on the inner wall of work-arm $40^b$ and the other end to a depending arm 162 on lever 159. The spring 160 allows the feed lever to swing forward and backward approximately on a radius equal to the length of the free spring, or in other words, the length of spring between the portions at the ends which are clamped to parts 160 and 161. At its forward end the feed-lever is guided and confined at its sides by two parallel guide-bars 163, 163 secured by screws to the inside of the hollow work-arm; a recess or groove 164 (Fig. 4) extending longitudinally along this end of the feed-lever receives the foot 165 (Fig. 5) of the feed surface 20; a screw 165$^a$ passing through an elongated opening 165$^b$ securing the parts together and allowing limited adjustment. When in its elevated position the feed-surface extends forward and upward through the throat-plate 28, as shown in Figs. 5 and 9. The circular movement of the feed eccentric 157, is by virtue of the swinging spring fulcrum of the feed-lever 159 transformed into an elliptical motion in the toothed feed-surface, the major axis of the ellipse (see 166, Fig. 9) being vertical or slightly pitched in the direction of feed, or in a direction opposite thereto, as desired. This throws the greater portion of the forward movement of the feed surface teeth above the work-plate, at which time they act to feed the work, the needles being elevated clear of the work (see Fig. 9).

Suitable means, which it is not necessary to here explain, are provided for lifting the presser-foot and associated parts and stitch-forming elements which operate above the throat-plate, and for simultaneously releasing the thread-tension devices, when it is desired to insert or withdraw work. In this operation the projecting end of an arm 127, Fig. 2, is moved upward. It will be understood that when the needles are elevated free of the work, the teeth of the feed-surface, in the normal operation of the machine, project above the surface of the throat-plate. In order that the teeth of the feed-surface may not interfere with removal of the work (particularly when the seam is stopped back from the edge of the work) when the needles are up and the presser-foot lifted, means are provided whereby the feed-surface will be dropped below the surface of the throat-plate. As will be seen this dropping of the feed-surface takes place simultaneously with the lifting of the presser-foot and release of the tensions. The outer end of lever-arm 127 is connected by a depending link 132, to a rock-arm 133 pivoted on a stud 134. Teeth 135 at the end of arm 133 are adapted to engage gear teeth on a sleeve 136 secured to the projecting end of feed-shaft 123. In operation, when the machine is stopped with the needles up, and the operative lifts the presser-foot and releases the tensions, as already explained, the lifting of arm 127 will swing the arm 133 upward and its teeth 135 will engage the teeth of 136 (which are so located as to come to position to be thus engaged when the machine is stopped with the needles up) and slightly rotate the feed shaft 123 in the direction of the arrow Fig. 6, until the teeth 125 pass the teeth of 136, the stud 125 leaving its driving pin 124$^d$ on gear 119, as shown in Fig. 6. This limited independent rotation of the feed-shaft causes its eccentric 157 to rock feed lever 159 sufficient to drop the feed surface below the surface of the throat-plate. When the machine is again started, the feed shaft and feed remain stationary until pin 124$^d$ again overtakes stud 125, from which it results that the normal positioning and timing is not affected by this temporary lowering of the feed while the needles are up.

*Loop-spreader.*—Loop-spreader 14, heretofore referred to and shown in Figs. 4, 5, 6 and 7, is in the shape of a bell-crank-lever, pivoted at one end on a pin 202 which latter is secured to hollow work-arm by a screw 203 (Fig. 4). A stud 205 depending from the underside of the loop-spreader at the angle or bend thereof is so connected with the end of the feed-lever 159 that the movements of the latter oscillate the spreader on its pivot pin 202, thus swinging the toothed end of the spreader back and forth transversely to the work-arm.

*Loopers and operating means therefor.*— Referring particularly to Figs. 4 and 5, 177 is the looper-lever. 183 is a looper carrier or block swiveled to turn on a headed stud 184, which after passing through the carrier enters a socket in the end of lever 177 where it is secured by screw 185. The four loopers 6$^a$, 7$^a$, 8$^a$ and 9$^a$ are secured together on the carrier 183. As shown in Figs. 8 and 9, each looper has a thread groove 196 extending along one side from its rear end to a thread-eye 197, and a short groove 196$^a$ along its other side from eye 197 to a second thread-eye 198. The loopers are actuated from the looper-eccentric 167 (Figs. 4, 6) heretofore mentioned through the pitman 169 and looper-lever 177. Said eccentric is embraced by the capped end 168 of pitman 169. About midway of its length, pitman 169 slidingly bears against a flattened seat 170$^a$ (Figs. 4, 5) in the work-arm. Above this seat an oblong opening in the pitman is closed at one side by a cap 169$^a$; the length of the slot permits the pitman to move longitudinally on bearing blocks 171, 171 in said opening, said blocks embracing and being movable about a headed pivot-stud 170 secured at its lower end in a socket in seat 170$^a$. A washer 173 on the stud 170 beneath the head thereof, extends over the bearing blocks and over the upper surface of the pitman at the sides of the rectangular opening therein, and confines the parts in operative position. Through these connections the eccentric moves the pitman longitudinally, and at the same time rocks it about the fixed pivot stud 170. A headed pivot pin 176 is secured to the forward end of pitman 169, in the elbow of the work-arm, by a screw 175, passing through a cap 174 and the end of said pin. The headed end of this pin is embraced by the capped end 178 of the looper-lever 177. A flattened under-surface on lever 177 bears and is slidable against a flattened horizontal seat or surface 177ᵃ at the bottom of the work-arm (Fig. 5). 181 is a headed pivot-stud fixed at its lower end in a socket through seat 177ᵃ by a screw 181ᵃ (Fig. 5), and embraced by a split bearing 180, consisting of two blocks similar to blocks 171. An elongated rectangular opening through the looper-lever above seat 177ᵃ embraces the bearing 180 beneath the head of pivot stud 181. From these connections it follows that the looper lever 177 may move longitudinally on and at the same time turn about pivot-stud 181 as a fulcrum, this combined movement being imparted to said lever from the pitman 169 through the connections explained, and resulting at the loopers in the elliptical movement indicated at 199 in Fig. 8.

*Passage of looper-threads to the loopers.*—From a rotary take-up 54 (Fig. 1), the looper-threads 6, 7, 8 and 9 pass through a thread-eye 209 (Fig. 6) directly below said take-up, and thence descend to four thread-eyes 216 (Fig. 4) in a bar across the inside of a thread-guard 217, whence they pass horizontally along the inside of the guard to four more thread-eyes 219, and from the latter through four grooves or channels in the upper surface of a bar 220 which bridges the hollow work-arm in a diagonal direction directly beneath the work-arm cover 40ᶜ (Fig. 4). From the ends of the grooves the threads pass through suitable eyes (not shown) on the front vertical wall of the work-arm along a recess or channel 221ᵃ (Fig. 4) in said wall beneath cover 223 (Fig. 3), between separating and guiding pins 222, arranged in a vertical row (only the top pin showing in Fig. 4) and through opening 190 (Fig. 4) to the thread-eyes 195 (Figs. 5 and 9) from which they pass to the loopers, as shown.

What I claim is:—

1. A sewing machine having a work-arm free at its work-supporting end at which the stitch-forming mechanism operates and at its other end joining the frame-work of the machine, said arm between its ends being bowed forward away from said frame-work and including an approximately horizontal bridging portion extending in a direction transverse to the direction of the work-supporting end of the arm and having a clearance beneath providing a space into which a hand or an arm of an operator may be passed below said bridging portion in holding, guiding or manipulating the work.

2. A sewing machine having a work-arm free at its work-supporting end at which the stitch-forming mechanism operates and supported entirely from its other end which joins the frame-work of the machine, said arm between its ends being bowed forward away from said frame-work and including an approximately horizontal portion extending in a direction transverse to the direction of the work-supporting end of the arm.

3. A sewing machine having a work-arm free at one end at which the stitch-forming mechanism operates and supported entirely from its other end which joins the frame-work of the machine, said arm between its ends being bowed forward from the main part of the machine in an approximately horizontal direction.

4. In a sewing machine, the combination with stitch-forming mechanism, of a work-arm free at one end at which the stitch-forming mechanism operates and supported entirely from its other end which joins the frame-work of the machine, said arm between its ends being bowed forward from the main part of the machine in an approximately horizontal direction; and driving connections extending along said arm to the part or parts of the stitch-forming mechanism operating at the free end thereof.

5. In a sewing machine, the combination with stitch-forming mechanism, of an elbowed work-arm free at one end at which the stitch-forming mechanism operates and supported from its other end which joins the frame-work of the machine, said arm extending outward in an approximately horizontal direction from the frame-work or casing at its supporting end and inward from an elbow to its free end.

6. A sewing machine having a work-arm free at one end at which the stitch-forming mechanism operates and supported from its other end which joins the frame-work of the machine, said arm extending from its supporting end outward from the frame-work, thence downward and thence inward toward the frame-work to its said free end.

7. In a sewing machine, the combination with stitch-forming mechanism including work-feeding means, of a work-arm free at one end at which the stitch-forming mechanism operates and supported from its other end which joins the frame-work of the machine, said arm extending from its supporting end outward from the frame-work thence downward and thence inward toward the frame-work to its said free end, said work-feeding means operating to feed the work toward or off the free end of the arm.

8. A sewing machine having a hollow work-arm free at one end at which the stitch-forming mechanism operates and supported from its other end which joins the frame-work of the machine thereby providing clearance beneath the arm, said arm between its ends being bowed outward from the main part of the machine.

9. A sewing machine having a hollow work-arm free at one end in which part or parts of the stitch-forming mechanism operates and supported from its other end which joins the frame-work of the machine thereby providing clearance beneath the arm, said arm between its ends being bowed forward from the main part of the machine in an approximately horizontal direction.

10. A sewing machine having a hollow work-arm free at one end at which the stitch-forming mechanism operates and supported from its other end which joins the frame-work of the machine thereby providing clearance beneath the arm, said arm between its ends being bowed forward from the main part of the machine in an approximately horizontal direction; and driving connections extending through said hollow work-arm to a part or parts of the stitch-forming mechanism operating in the free end thereof.

11. In a sewing machine, the combination with stitch-forming mechanism of a hollow elbowed work-arm free at one end at which the stitch-forming mechanism operates and supported from its other end which joins the frame-work of the machine thereby providing clearance beneath the arm, said hollow arm extending outward in an approximately horizontal direction from the frame-work at its supporting end and inward from an elbow to its free end; and driving connections extending through said hollow work-arm to a part or parts of the stitch-forming mechanism operating in the free end thereof.

12. A sewing machine having a work-arm extending outward from the frame-work of the machine, thence downward, and thence in an approximately horizontal direction to its outer free end, said work-arm being supported from its end which joins the frame-work of the machine, thereby providing clearance beneath the arm for a hand or arm of an operator.

In testimony whereof I have signed this specification in the presence of two subscribing witnesses.

CHRISTINA P. BORTON,
*Administratrix of the estate of Stockton Borton, deceased.*

Witnesses:
HERBERT E. MATHEWSON,
JAMES C. COLLINS, Jr.